July 13, 1954  E. L. EVANS  2,683,344
ROTATABLE RAKE AND CONDITIONER FOR LAWNS
Filed Dec. 14, 1951  2 Sheets-Sheet 1

INVENTOR
EDWARD L. EVANS,
BY
McMorrow, Berman & Davidson
ATTORNEYS

July 13, 1954 E. L. EVANS 2,683,344
ROTATABLE RAKE AND CONDITIONER FOR LAWNS
Filed Dec. 14, 1951 2 Sheets-Sheet 2
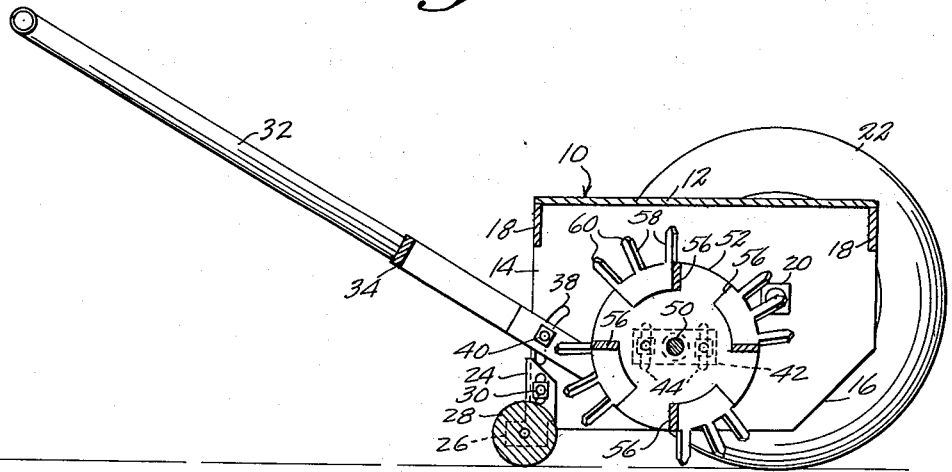
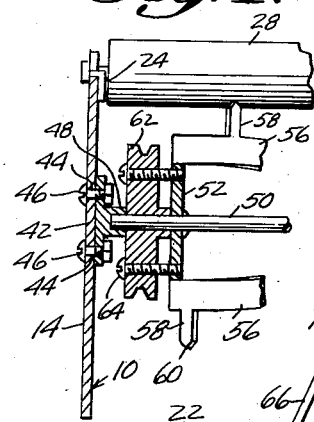
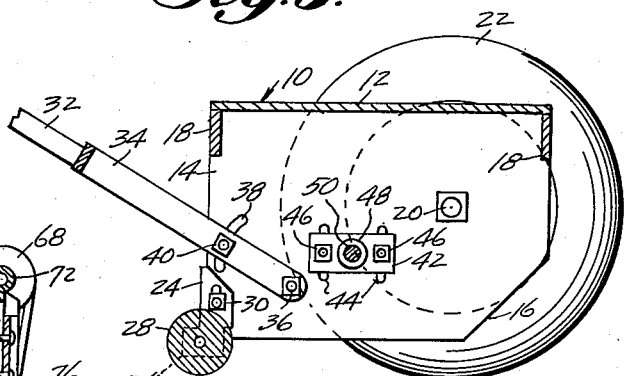
INVENTOR
EDWARD L. EVANS,
BY
McMorrow, Berman & Davidson
ATTORNEYS Patented July 13, 1954

2,683,344

UNITED STATES PATENT OFFICE 2,683,344

ROTATABLE RAKE AND CONDITIONER FOR LAWNS

Edward L. Evans, Eugene, Oreg.

Application December 14, 1951, Serial No. 261,685

2 Claims. (Cl. 56—27)

This invention relates to lawn maintenance equipment. More particularly, the invention has reference to a lawn rake and conditioner of the rotary type, the construction of the machine being such as to permit its use, when made in a larger size, on pasture lands or other large areas.

Over a period of time, moss tends to appear in a lawn, and forms a mat penetrated by water and fertilizers only with difficulty. This undesirable condition is aggravated, in many instances, by the matting of dead grass, this being particularly true with respect to certain types of grass such as creeping bent.

Unless the moss and matted, dead grass are removed periodically from a lawn, water and fertilizers applied thereto tend to run off to a lower level in the lawn. As a result, the lower portions of the lawn receive all the benefits obtained by watering and fertilizing of the grass, causing a spotted condition in which the lawn will appear green in spots and dried up in others.

It will be readily appreciated, therefore, that an annular, thorough raking of lawns is desirable in order to produce a rich and luxuriant growth, this being particularly true with certain types of grasses such as that mentioned above. However, the operation, when performed with a conventional garden rake, is a tedious and time consuming task, and as a result is often omitted to the accompanying detriment of the lawn.

It is therefore the main object of the present invention to provide an improved rotary rake and lawn conditioner, which will be adapted, by reason of a novel construction thereof, to rake debris from a lawn and condition the grass in minimum time and without difficulty.

Another important object is to provide a rotary rake and lawn conditioner as stated including a novelly formed reel adapted for high speed rotation when driven by a suitable engine.

A further important object is to provide a lawn rake of the type stated wherein the reel will be formed with a plurality of elongated bars spaced circumferentially thereabout and extending spirally about the axis of rotation of the reel, said bars being provided with radial, widely spaced rake teeth staggered about the reel in an arrangement found particularly efficient in the raking up of moss and matted dead grass.

Still another important object is to provide a rotary rake and lawn conditioner which will be so designed as to be capable of manufacture at relatively low cost, and will comprise a minimum of parts so arranged as to promote trouble free operation.

Other objects will appear from the following description, the claims appended thereto, and from the annexed drawing, in which like reference characters designate like parts throughout the several views, and wherein:

Figure 3 is a longitudinal sectional view;

Figure 4 is a detail sectional view taken substantially on line 4—4 of Figure 2;

Figure 5 is a longitudinal sectional view taken on line 5—5 of Figure 2; and

Figure 6 is a longitudinal sectional view taken on line 6—6 of Figure 2.

Figure 1:
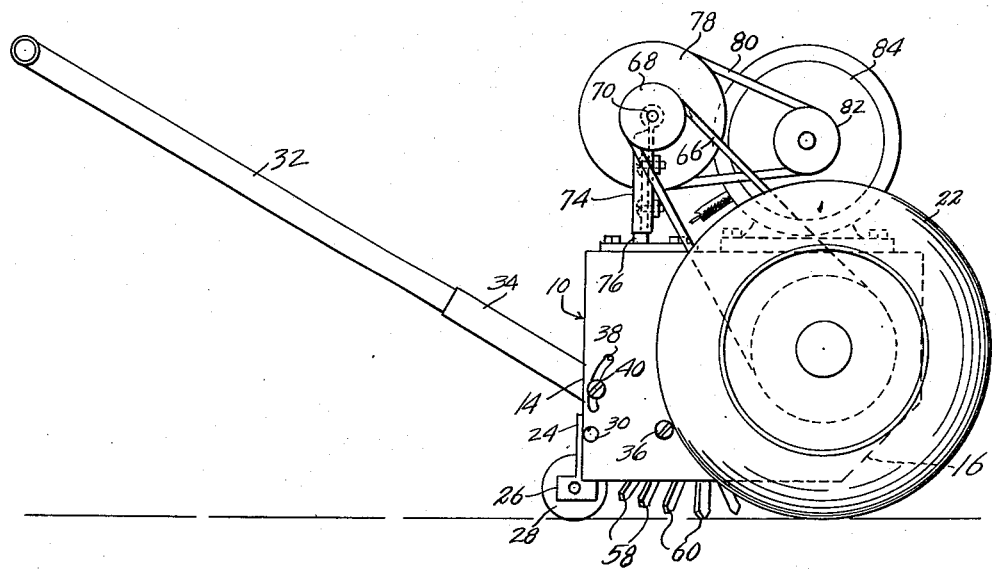
Figure 1 is a side elevational view of a rotary lawn rake formed in accordance with the present invention.

The lawn rake and conditioner formed in accordance with the present invention includes a wheeled frame generally designated 10, said frame being preferably provided with a flat top plate 12 of generally rectangular shape, and disposed horizontally across the upper end of the frame.

Integral or otherwise rigid with the top plate 12, at the opposite sides of said top plate, are depending side plates 14, which are also of rectangular configuration, the side plates 14 being disposed horizontally at opposite sides of the frame. As may be noted from Figures 3, 5, or 6, the lower front corner of each side plate 14 is cut away angularly as at 16. This is for the purpose of preventing rocks or other obstructions from interfering with the frame during the operation of the device.

For the purpose of reinforcing the frame, I provide front and rear reinforcing bars 18, extending transversely of the frame between the respective side plates 14.

Projecting outwardly from the respective side plates 14, contiguous to the front edges of said side plates, are wheel spindles 20, on which are rotatably mounted ground-engaging wheels 22.

Roller support plates 24 are secured to the back edges of the side plates 14, and are provided with rearwardly offset lower ends 26 having openings receiving end trunnions provided upon a ground roller 28. The plates 24 are vertically slotted (Figure 5), and fastening elements 30 extend through the slots and through the side plates 14, thus to mount the ground roller 28 for up and down adjustment relative to the supporting frame, thereby to provide a depth regulating means for the rake teeth of the device.

A handle 32 extends rearwardly and upwardly from the supporting frame, said handle being rigidly secured at its inner end to a yoke 34, the arms of which are pivotally connected as at 36 to the side plates 14. Rearwardly of the pivotal connections 36, the side plates 14 are formed with arcuate slots 38, receiving bolts 40 carried by the yoke arms, thus to permit the handle 32 to be adjusted upwardly and downwardly to suit the convenience of the user.

Positioned against the inner surfaces of the side plates 14, and spaced rearwardly from the wheel spindles 20, are bearing plates 42, said bearing plates being disposed against pairs of vertical slots 44 formed in the side plates. Fastening elements 46 extend through the opposite ends of the respective bearing plates 42, and through the slots 44, thus to mount the bearing plates for vertical adjustment relative to the supporting frame.

Each bearing plate 42 is provided, intermediate its opposite ends, with an inwardly extending journal or socket 48, the sockets 48 being coaxially aligned and receiving the opposite ends of a reel shaft 50. The reel shaft 50 has fixedly secured thereto a pair of end plates 52, and a center plate 54 is also fixedly secured to the reel shaft, medially between the opposite ends of the shaft. The plates 52, 54 are of circular shape.

The reel includes a plurality of elongated rake bars 56, these being spaced circumferentially about the reel as may be readily noted from Figure 3. At their opposite ends, the rake bars 56 are fixedly secured to the end plates 52 of the reel, and medially between their ends, the rake bars are fixedly attached to the center plate, thus to reinforce the intermediate portion of the reel.

The rake bars 56 are formed of flat bar stock, and are arranged spirally about the axis of rotation of the reel.

Integral or otherwise made rigid with the outer longitudinal edge of the respective rake bars 56 are rake teeth 58, the rake teeth 58 being spaced longitudinally of said bars. The teeth 58 are disposed radially of the reel, and project outwardly beyond the outer longitudinal edges of the rake bars substantial distances, the outer or free ends of the rake teeth being pointed as at 60.

Figure 2:
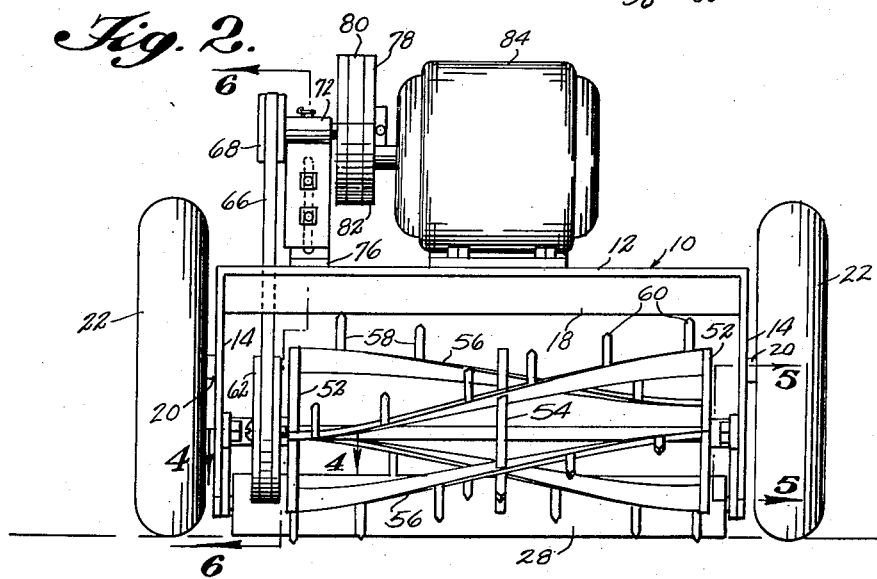
Figure 2 is a front elevational view.

As may be noted from Figure 2, the rake teeth of each bar are spaced widely apart, and are staggered slightly longitudinally of the reel relative to the rake teeth of the bars immediately adjacent thereto.

It should be noted at this point that the rotary reel illustrated is rotated at high speed in the preferred embodiment of the invention, and, therefore, is power driven in the illustrated example.

The driving means illustrated includes a driven pulley 62, fixedly secured to one end plate 52 by means of diametrically opposite bolts 64 or their equivalents. Driving the pulley 62 is a belt 66 extending upwardly through a suitable opening formed in top plate 12 of frame 10, belt 66 being passed around a small pulley 68 mounted on a jack shaft 70 journaled in a bearing sleeve 72 formed upon the upper end of a vertically slotted bearing plate 74. The bearing plate 74 is mounted for vertical adjustment upon an upstanding bracket 76, the bracket 76 being provided with vertically spaced clamping bolts extending through the slotted bearing plate 74.

Secured to and adapted to rotate the jack shaft is a large pulley 78 around which is passed a belt 80, that also passes around a small pulley 82 mounted upon the shaft of an engine 84. An electric motor has been illustrated in the present instance, but other power means could be employed as well.

In use, operation of the power means 84 is effective to transmit rotatable movement to the rotary wheel, while the structure is being pushed across a lawn. The pointed ends of the rake teeth extend downwardly to a sufficient extent to engage and rake out moss and matted, dead grass, and thus are adapted to rapidly clear the lawn of this undesirable debris, while at the same time conditioning the lawn. In this way, a large lawn can be raked and conditioned in a relatively short period of time, without difficulty.

It will be understood that the motor 84 would be mounted for movement longitudinally of the device, thus to adjust the tension of the belt 80. Additionally, the up and down adjustment of the jack shaft is also adapted to permit tension adjustments of the belts.

Still further, it is believed of importance to note that instead of a belt drive, the device could be operated with equal efficiency through the medium of a sprocket and chain drive. This is believed to be a sufficiently obvious modification of the illustrated structure as not to require separate illustration in this application.

During the use of the device, rake contacts are obtained each half inch, longitudinally of the reel, in the preferred embodiment of the invention, and as a result, the complete area of the lawn is efficiently covered.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a lawn rake, a wheeled frame having a top plate and side plates depending from opposite ends of said top plate, a rotary rake extending between and journalled on said end plates beneath said top plate and having a rake pulley, a motor mounted upon the top of said top plate having a motor shaft paralleling the axis of said rotary rake and having a drive pulley thereon, a fixed standard rising from the top plate at a point laterally spaced from the motor shaft, said standard being provided with vertically elongated slots, a vertical bearing plate engaged along said standard, bolts traversing the bearing plate and the slots of the standard, said bearing plate having an upper end having a bearing thereon, a jack shaft journalled in said bearing and having ends projecting beyond opposite sides of the bearing, said jack shaft being parallel to the motor shaft, jack shaft pulleys on the opposite ends of the jack shaft, a first belt trained over the motor shaft pulley and one of the jack shaft pulleys, and a second belt trained over the other jack shaft pulley and the rotary rake pulley, the said bearing plate being vertically adjustable relative to said standard for simultaneously tightening and loosening said first and second belts.

2. In a lawn rake, a wheeled frame having a top plate and side plates depending from opposite ends of said top plate, a rotary rake extending between and journaled on said end plates beneath said top plate and having a rake pulley, a motor mounted upon the top of said top plate having a motor shaft paralleling the axis of said rotary rake and having a drive pulley thereon, a fixed standard rising from the top plate at a point laterally spaced from the motor shaft, said standard being provided with vertically elongated slots, a vertical bearing plate engaged along said standard, bolts traversing the bearing plate and the slots of the standard, said bearing plate having an upper end having a bearing thereon, a jack shaft journalled in said bearing and having ends projecting beyond opposite sides of the bearing, said jack shaft being parallel to the motor shaft, jack shaft pulleys on the opposite ends of the jack shaft, a first belt trained over the motor shaft pulley and one of the jack shaft pulleys, and a second belt trained over the other jack shaft pulley and the rotary rake pulley, the said bearing plate being vertically adjustable relative to said standard for simultaneously tightening and loosening said first and second belts, said rotary rake having an axial rake shaft having opposed ends, bearing plates in which the ends of the rake shaft are journalled, and bolt and vertical slot means securing said bearing plates to the frame side plates and providing for vertical adjustment of the rotary rake relative to the frame.

References Cited in the file of this patent

UNITED STATES PATENTS

| Number | Name | Date |
|---|---|---|
| 666,689 | Phillips | Jan. 29, 1901 |
| 678,461 | Egan | July 16, 1901 |
| 998,544 | Mosher | July 18, 1911 |
| 2,089,445 | Stauffer | Aug. 10, 1937 |
| 2,525,090 | Bott | Oct. 10, 1950 |